United States Patent Office 3,180,903
Patented Apr. 27, 1965

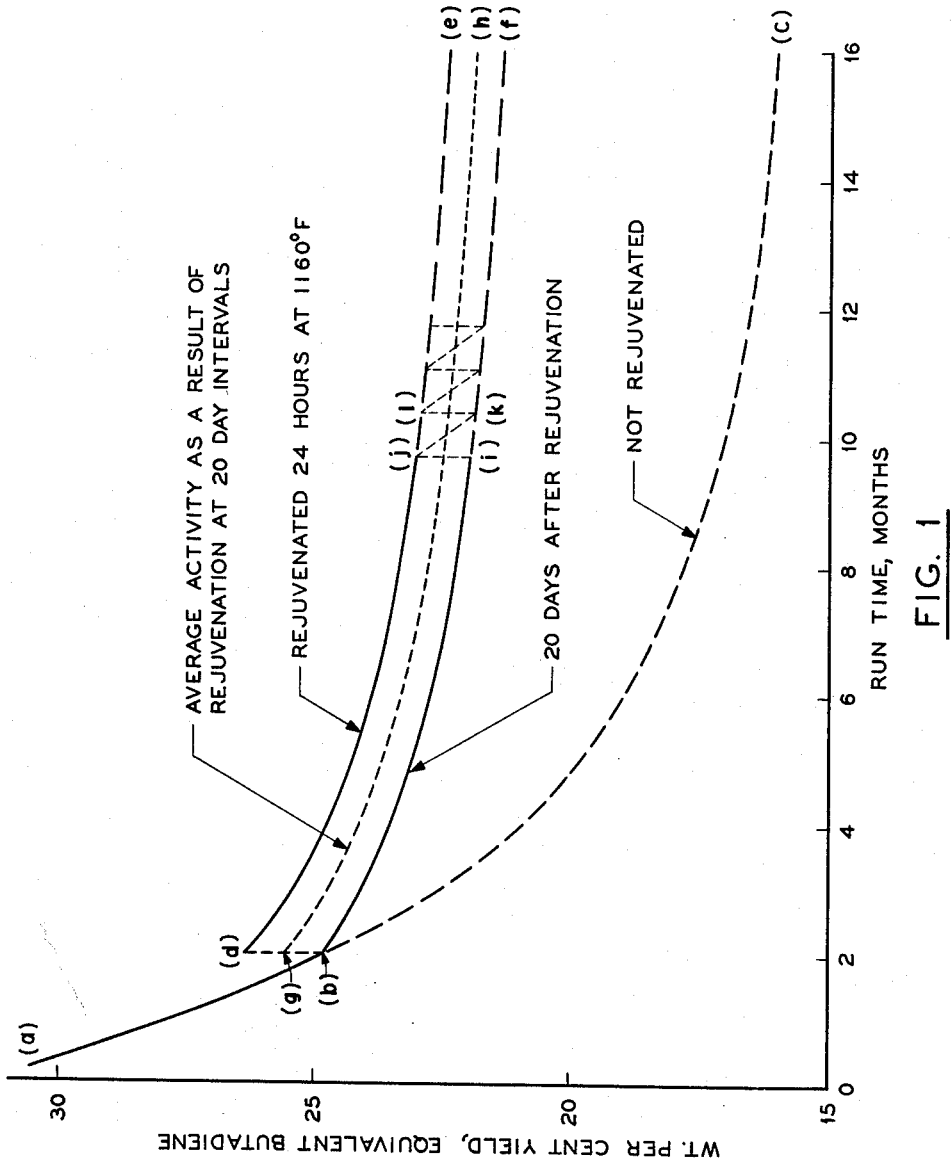

3,180,903
PROCESS OF DEHYDROGENATION WITH CATALYST REJUVENATION
Robert H. Lindquist, Berkeley, Bernard F. Mulaskey, El Sobrante, and Hugh F. Harnsberger, San Rafael, Calif., assignors to California Research Corporation, San Francisco, Calif., a corporation of Delaware
Filed Aug. 21, 1958, Ser. No. 756,089
5 Claims. (Cl. 260—680)

This invention relates to a method for restoring the activity of a catalyst comprised of chromia or molybdena on an alumina support. More particularly, the method is one involving an extended heat treatment which is practiced periodically after some days or weeks of operation to restore the activity of the catalyst to a level approximating that reached during the preceding rejuvenation treatment.

The catalysts which are treated in accordance with the process of the present invention are comprised of microporous alumina of so-called gel origin on which is deposited a total of from about 3 to 40% by weight of one or more Group VI metal oxides selected from the group consisting of chromium oxides and molybdenum oxides. The catalyst may also contain one or more alkali metal oxides in amounts ranging from trace quantities to those totaling approximately 3% by weight. Thus, for operations leading to the production of butenes and butadiene from the corresponding $C_4$ precursors (wherein the present invention finds particular utility) the catalyst preferably contains from 0.025 to 0.5% by weight potassium oxide.

The gel-type alumina forming the base of the catalyst can be prepared, for example, by precipitation from an acidic aqueous solution of an aluminum sulfate, nitrate or other salt by the addition of ammonium hydroxide or other alkaline precipitating agent. The resulting hydrogel is thereafter washed and filtered to remove soluble inorganic contaminants, whereupon the washed product is dried, preferably by spray drying methods, to secure a finely divided powder. If it is desired to incorporate potassium or other alkali metal in the catalyst, the same may now be added at this juncture by slurring the powdered alumina with a solution of a heat-decomposable salt of the alkali metal or with an alkali metal salt of an anion of the Group VI metal to be employed, the resulting slurry then being dried and formed into pellets or similar particles of the desired shape, optionally in the presence of graphite or other pelleting lubricant.

The shaped alumina material is then calcined at temperatures above about 1300° F. For several hours, following which the resulting product is impregnated with an aqueous solution of the desired Group VI metal component such for example, as chromic acid, chromic nitrate, ammonium dichromate, ammonium molybdate, or the like. The catalyst is then again calcined at temperatures above 1300° F. for several hours.

The foregoing method of preparation is given by way of example, and other methods for obtaining catalysts having substantially the same properties will suggest themselves to those skilled in the art.

Catalysts of the type described above can be employed in a wide variety of operations, including processes for the cracking, reforming, dehydrogenation and isomerization of hydrocarbons. However, they the particularly well adapted for use in cyclic, adiabatic operations involving the dehydrogenation of aliphatic hydrocarbons containing from 2 to 5 carbon atoms in the molecule. Of such dehydrogenation reactions, those resulting in the production of butenes and butadiene from a butane-rich feed stream are presently of the greatest significance from the commercial standpoint. Accordingly, the invention will generally be described hereinafter as it relates to operations of this character.

In carrying out a cyclic, adiabatic dehydrogenation process, the desired olefin and diolefin products are formed during an endothermic, conversion portion of the cycle which is followed (with an intervening purge step, if desired) by an exothermic regeneration cycle portion wherein carbonaceous deposits present on the catalyst surface are burned, thus furnishing the catalyst bed with the heat required for the succeeding conversion step. During this regeneration step it is customary to employ an amount of air or other free oxygen-containing gas which is much larger than that required to burn off the carbon, said excess gas serving to equalize temperature irregularities and to blow out of the bed any objectionable portions of the temperature pattern which exists therein. This use of an excess of the regeneration gas is customarily referred to in the art as an "air blow" and forms the subject of U.S. Patent No. 2,474,014, to Seebold. For the carbon-burning portion proper of the regeneration phase of the operating cycle, it is found that about 50 cubic feet of air per cubic foot of catalyst bed will more than suffice. However, the amount of air used in the ensuing blow portion of the regeneration step is not dependent on the amount of carbonaceous materials present, but only on the total amount of catalyst and any inert materials present therein, and the location of incipient hot or cold spots to be shifted in the catalyst bed. To blow a temperatures pattern entirely out of the bed requires an amount of hot air or gas having a heat capacity (mass multiplied by specific heat) which is roughly equal to that of the entire catalyst bed. This amount of gas is referred to as a full "slug." Thus, while 50 cubic feet of air provides a reasonable excess for regeneration, approximately 1300 cubic feet are required for a complete temperature pattern blow out. Many operations employ about one-sixth to one-third of a slug for each regeneration, with a full slug being utilized only after the bed has passed through a number of cycles of operation.

In those operations concerned with the conversion of butane to butenes and butadiene, the duration of the conversion portion of the cycle is from about 5 to 20 minutes, with the regeneration portion thereof having a generally similar length. Such a period suffices to provide the bed not only with the gas required to effect carbon composition, but also with the desired fragmentary air blow. When, after several cycles of such operation it may be necessary to supply a complete slug of air to the bed, then the regeneration portion of that cycle is correspondingly lengthened to a period of 1–1.5 hours, the particular time depending somewhat on blower capacity.

In operations of the type described above as well as others wherein the catalyst hereof finds utility, it is found that the catalyst suffers an extensive decline in activity as it remains in service week after week. This loss in activity, which is reflected in reduced per-pass conversion levels, can be compensated for to some extent by raising reaction temperatures. However, this is but a temporary expedient, for soon the point is reached where the temperature cannot be raised any further, either because of equipment limitations or because of the fact that losses to coke and undesired light gas products become intolerably high. The rejuvenation or reactivation process of the present invention directionally corrects this decline in activity and extends the useful life of the catalyst over a much longer period than would otherwise be possible.

The process of the present invention rests on the discovery that catalysts of the chromia or molybdena-on-alumina type, as described above, which have been reduced in activity as a result of continued on-stream use can be rejuvenated (i.e., restored in activity) by a treatment involving heating said catalysts in the presence of air or other free oxygen-containing gas for a period of from about 4 to 40 hours at temperatures of from about 1050 to 1500° F. A preferred practice is to heat the catalysts for a period of from 15 to 30 hours at temperatures falling within a range of from about 1100 to 1300° F. In general, the lower the rejuvenation temperature the longer will be the holding period required in order to obtain a given amount of restoration in activity. The lower temperature (1050° F.) is about the minimum for rejuvenation in a time consistent with value of lost production as the catalyst is taken out of service, while the upper temperature limit (1500° F.) is selected to avoid undue loss in the surface area of the catalyst. The length of the on-stream interval between successive catalyst rejuvenation treatments depends on economic factors, i.e., the value of lost production due to activity decline versus value of lost production encountered as a result of taking the catalyst out of service to permit rejuvenation. However, in most cases the intervals will generally range from 10 to 30 days in actual plant operation. While rejuvenation does not restore 100% of the activity which the catalyst possessed at the end of the last previous reactivation treatment, the percent restoration in activity is so near 100% that the life of the catalyst is very markedly extended.

As will be seen from the preceding paragraph, the rejuvenation process of the present invention requires holding the catalyst at an elevated temperature in the presence of an oxygen-containing gas for a very long period of time relative to that required to cyclically regenerate the catalyst even when providing the same with a full slug of blow gas. The reactions and temperature changes occurring during this regeneration portion of the operating cycle are essentially dynamic and rapid in character, requiring definite quantities of air "blow" extending over comparatively short periods to burn off carbon and to redistribute hot spots and displace temperature patterns by heat conduction. The rejuvenation process is essentially static and slow in character, involving mainly only time and temperature, with no specification on the amount of oxygen containing gas used other than that oxygen be present at all times. The rejuvenation process need not be conducted in situ, although it is convenient to do so provided a sufficient number of reactors are available to permit blocking one off for the required amount of rejuvenation time. While no definite evidence exists on the point, it is theorized that rejuvenation involves slow, solid state reactions and perhaps crystallization phase changes of the chromium or molybdenum oxides, which changes cause restoration of said oxides to the active surface of the catalyst from a state of solution in the solid alumina substrate, and it may also be that valence changes in the chromium or molybdenum are involved.

The process of the present invention is illustrated in various of its embodiments in the examples given below. In connection with the data provided by said examples, the term "butane conversion" represents the wt. percent of butane in the feed minus the wt. percent of butane in the product, divided by the wt. percent butane in the feed×100. The term "dehydrogenation selectivity," as employed herein, is a function of the ultimate calculated yield of butadiene and assumes that butene in the product (over and above that recycled to the conversion zone) can be converted to butadiene in a separate dehydrogenation process in a yield of 68.6%. Specifically:

$$\text{Dehydrogenation selectivity} = 100 \times \frac{\text{Wt. percent butadiene in product} + 0.686 \times (\text{wt. percent butene in product} - \text{wt. percent butene in feed})}{\text{Butane conversion} \times \text{wt. percent butane in feed}}$$

The numerator of the fraction in the above equation is defined as the "butadiene equivalent yield."

EXAMPLE I

The dehydrogenation runs shown in Table I were conducted in a pilot, adiabatic unit with semiautomatic control in order to reproduce commercial operating conditions. The feed employed was largely butane, the exact composition being shown in the table. The unit operated on a 17½ minute cycle: 7½ minutes hydrocarbon feed at 0.8 v./v./hr. at the indicated absolute pressure and the

*Table I*

EFFECT OF REJUVENATION ON ACTIVITY OF CHROMIA-ALUMINA-K₂O CATALYST

| Run | (a) | (b) | (c) | (d) | (e) |
|---|---|---|---|---|---|
| Catalyst service or heat treatment | Substantially fresh catalyst (one week plant exposed) | 7 weeks plant exposed | 7 weeks plant exposed plus 24 hours rejuvenation at 1,160° F. | 12 weeks plant exposed | 12 weeks plant exposed plus 8 hours rejuvenation at 1,160° F. |
| Catalyst composition, wt. percent: | | | | | |
| Alumina | 81.69 | | | | |
| Cr₂O₃ | 18.0 | 18.0 | 18.0 | 18.0 | 18.0 |
| K₂O | 0.31 | 0.27 | 0.31 | 0.30 | 0.31 |
| Inlet temperature, °F | 1,178 | 1,178 | 1,178 | 1,232 | 1,232 |
| Space rate, v./v./hr | 0.82 | 0.77 | 0.73 | 0.76 | 0.76 |
| Reactor bottom pressure, cm. Hg | 18 | 18 | 18 | 18 | 18 |
| Feed analysis, wt. percent: | | | | | |
| Butane | 89.4 | 89.4 | 90.5 | 88.8 | 88.8 |
| Butene | 5.2 | 5.2 | 5.9 | 6.1 | 6.1 |
| Isobutane | 3.8 | 3.8 | 3.1 | 3.1 | 3.1 |
| C₅⁺ | 1.6 | 1.6 | 0.5 | 2.0 | 2.0 |
| Product analysis, wt. percent: | | | | | |
| Carbon | 2.2 | 0.8 | 2.0 | 1.2 | 2.3 |
| Hydrogen | 2.1 | 1.2 | 2.8 | 2.1 | 2.3 |
| C₃⁻ and C₅⁺ | 2.8 | 1.4 | 6.2 | 8.7 | 5.4 |
| Butadiene | 6.4 | 3.6 | 5.4 | 7.1 | 7.7 |
| Butenes | 34.8 | 23.7 | 34.6 | 28.9 | 32.7 |
| Butane | 51.7 | 69.3 | 49.0 | 52.0 | 49.6 |
| Yield factors: | | | | | |
| Butadiene equivalent yield, wt. percent | 27.1 | 16.6 | 25.5 | 23.1 | 28.4 |
| Selectivity, percent | 65.0 | 69.8 | 57.5 | 58.0 | 67.2 |
| Conversion, percent butane | 44.5 | 25.6 | 47.7 | 43.4 | 46.0 | indicated inlet temperature; 7½ minutes air blow at about atmospheric pressure (and at the same inlet temperature as used for the hydrocarbon feed) to burn off carbon deposits and effect some leveling of bed temperatures; and 2½ minutes intermediate time for purging with nitrogen and for evacuation between the "make" and regeneration steps of the cycle. The unit operates with 4 liters of catalyst in a bed 3 inches in diameter by 3-feet long. The air blow of 7½ minutes corresponds to ⅓ slug.

Table I shows inspections, operating conditions, and yields for catalyst employed in commercial service and tested in pilot equipment. Columns (a), (b), and (c) are for a particular catalyst after (a) one week exposure in a commercial plant (i.e., substantially fresh catalyst); (b) seven weeks' commercial service; (c) seven weeks' commercial service followed by rejuvenation by air treatment at 1160° F., for 24 hours. Note that the seven-week catalyst (Column (b)) shows only 25.6% conversion versus 44.5% for the one-week catalyst at the same inlet temperature. Note from Column (c) that the same catalyst after seven weeks' plant exposure plus rejuvenation for 24 hours at 1160° F., shows a conversion of 47.7% at the same inlet temperature (1178° F.), an equivalent butadiene yield of 25.5% compared to 16.6% for the unrejuvenated seven-week catalyst, and 27.1% for the one-week catalyst.

Columns (d) and (e) show corresponding information on (d) the same catalyst after 12 weeks' plant exposure and (e) the same catalyst after rejuvenation by 8 hours' air blow at 1160° F. Note that rejuvenation increases the butane conversion from 43.4% to 46.0% and the butadiene equivalent yield from 23.1 to 28.4 weight percent. The effect is somewhat less marked here than for the first catalyst in Table I because of the shorter rejuvenation time employed (8 hours versus 24 hours). Yields for the 12-week unrejuvenated catalyst are somewhat better than for the seven-week unrejuvenated catalyst because of the higher inlet temperature employed (1232° F. versus 1178° F.)

EXAMPLE II

The dehydrogenation runs of Table II below were carried out charging butane over a catalyst free from potassium oxide but containing 0.2 weight percent sodium oxide and 18 weight percent $Cr_2O_3$ on high area alumina. The runs were made on a Schwab-type differential microreactor modified for gas feed. This type of reactor is described fully in an article by P. B. Weiss and C. D. Prater in vol. VI (1954), page 143, of the symposium "Advances in Catalysis," 1956, Academic Press, New York, New York, and also in an article by C. D. Prater and Rudolph M. Lago in vol. VIII (1956), page 293, in the same series. The differential reactor requires the use of a very small quantity of catalyst (e.g., 20 to 100 milligrams) in a thin layer to minimize diffusion effects and yields directly the reaction rate at a known concentration of reactant, that is, a reactor in which the conversion of reactants of products is small (less than 1%).

Table II

DIFFERENTIAL REACTOR BUTANE DEHYDROGENATION ACTIVITY AT 1000° F. FEEDING 5000 TO 7000 MICROGRAMS PER SECOND OF BUTANE

| Catalyst history and treatment | Activity, micromoles butene produced per second per gram of catalyst |
|---|---|
| a. Fresh sodium oxide-containing catalyst | 3.0 |
| b. After 29 hours deactivation at 1,600° F. in hydrogen | 0.8 |
| c. Above after 29 hours rejuvenation at 1,160° F. in air | 2.8 |

The sample use in line (b) of Table II was artificially deactivated by exposure to hydrogen at 1600° F. This accelerated deactivation reproduces the effect of long-continued plant exposure. It will be noted from the result in line (b) that rejuvenation by air treatment for 29 hours at 1160° F. restored the activity to over 93% of the original value.

EXAMPLE III

The dehydrogenation run of Table III, below, was made with a catalyst containing 18 weight percent $Cr_2O_3$, and which had been freed from alkali metals by Soxhlet extraction with water for 24 hours at 212° F. Butane was employed as charge.

Table III

DIFFERENTIAL REACTOR BUTANE DEHYDROGENATION ACTIVITY AT 1000° F. FEEDING 5000 TO 7000 MICROGRAMS PER SECOND OF BUTANE

| Catalyst history and treatment | Activity, micromoles butene produced per second per gram of catalyst |
|---|---|
| a. 14 week plant exposed catalyst (containing 0.3 wt. percent $K_2O$ and 18% $Cr_2O_3$ | 0.8 |
| b. Same as (a) but freed from $K_2O$ by Soxhlet extraction | 0.8 |
| c. Above after 24 hours rejuvenation in air at 1,150° F | 3.8 |

The improvement by rejuvenation is evident. The fact that catalysts (a) and (b) show identical activity reflects the observed fact that although potassium oxide is ordinarily effective in improving the activity of chromia-alumina dehydrogenation catalysts, it is not involved in the extensive type of deactivation which is corrected by rejuvenation.

EXAMPLE IV

The effect of length of rejuvenation on subsequent conversion is illustrated in Table IV for rejuvenation at 1160° F. and subsequent plant operation in the conversion portion of the cycle at about 1180° F. inlet temperature to the reactors.

Table IV

| Hours at 1,160° F. during rejuvenation | Percent increase in butane conversion over original sample |
|---|---|
| 0 | 0 |
| 4 | 30 |
| 10 | 60 |
| 20 | 77 |
| 30 | 87.5 |
| 40 | 92.5 |

As indicated, the incremental gain in conversion is very rapidly at first but becomes increasingly smaller and less remunerative at the longer times. As indicated hereinabove, the effect of regeneration at temperatures greater than 1160° F. would be to increase the percent gain in conversion at shorter rejuvenation times. The gain thus obtained is ultimately limited by rapid increase in loss of catalyst surface and in equipment limitations as 1500° F. is approached. Conversely, at temperatures below about 1100° F., the required rejuvenation time becomes less economic due to the unduly prolonged reactor shut-down time.

EXAMPLE V

Attention is directed to the figure of the accompanying drawing which represents the results obtained in a commercial operation in which the process of the present invention was employed. In this drawing, weight percent yield of equivalent butadiene (as defined hereinabove) is plotted versus time during the commercial run in months. In the curve (a)–(b)–(c), the portion (a)–(b) represents actual operation during about the first two months of plant operation, point (b) represents the time at which rejuvenation began to be practiced. The portion (b)–(c) of the curve represents an estimate of the yields which would have been obtained during the remainder of the run if rejuvenation had not been practiced. This estimate is based on the activity decline rate evinced during the portion (a)–(b) of the run and other related information on the catalyst. At the time indicated by point (b), the catalyst was rejuvenated for 24 hours at 1160° F. in the presence of air, and as a result, the catalyst activity was restored to the level indicated by point (d). During the remainder of the run, the catalyst was regenerated at intervals of about 20 days. During each such interval the catalyst activity declined from the level indicated by curve (d)–(e), to the level indicated by curve (b)–(f), and between each such interval, the catalyst was rejuvenated at about 1160° F. for about 24 hours and its activity thereby restored to the level indicated by the curve (d)–(e). For purposes of illustration, a representative sequence is shown at a theoretical run time of about 10 months, where (i)–(j) represents a rejuvenation, (j)–(k) the subsequent 20-day period of activity decline, and (k)–(l) the subsequent rejuvenation. The resulting over-all average activity level is represented by the curve (g)–(h).

The particular interval between rejuvenations and the temperature and time of rejuvenation employed in the foregoing illustration were adapted to the economics and operating characteristics of the particular plant involved. Other plants might require adjustment of these conditions within the limits of the present invention.

We claim:

1. In a process for the dehydrogenation of an aliphatic hydrocarbon containing 4 carbon atoms in the molecule over a fixed bed of particulate material composed of chromium oxide supported on a gel-type alumina wherein the feed hydrocarbon is catalytically dehydrogenated by cyclic adiabatic process involving periods of alternate hydrocarbon dehydrogenation and catalyst regeneration, the improvement which comprises periodically interrupting said cyclic process after a plurality of such alternating periods to reactivate the catalyst by treating the same at a temperature of from about 1100–1500° F. in the presence of free oxygen-containing gas for a period of at least several hours.

2. In a process for the conversion of an aliphatic hydrocarbon containing 4 carbon atoms in the molecule wherein the feed hydrocarbon is catalytically dehydrogenated by a cyclic adiabatic process involving a practice of successive hydrocarbon conversion and catalyst regeneration steps, and wherein the catalyst is present in the form of a fixed bed of particulate material comprised of chromium oxide supported on a gel-type alumina, the improvement which comprises periodically interrupting said cyclic process at intervals of not less than about 10 days to rejuvenate the catalyst by maintaining the same at a temperature of from about 1100 to 1500° F. in the presence of a free oxygen-containing gas for a period of at least about 4 hours.

3. In a process for the conversion of aliphatic hydrocarbons containing from 2 to 5 carbon atoms in the molecule wherein the feed hydrocarbon is catalytically dehydrogenated by a cyclic adiabatic process involving a practice of successive hydrocarbon conversion and catalyst regeneration steps, and wherein the catalyst is present in the form of a fixed bed of particulate material comprised of a gel-type alumina and, supported thereon, from about 3 to 40% by weight of chromium oxide, the improvement which comprises periodically interrupting said cyclic process, at intervals of not less than about 10 days, to rejuvenate the catalyst by maintaining the same at a temperature of from about 1050 to 1500° F. in the presence of a free oxygen-containing gas for a period of from about 4 to 40 hours to cause restoration of said chromium oxide to the active surface of the catalyst from a state of solution in the solid alumina substrate.

4. The process of claim 3 wherein a butane-rich feed stream is employed, and wherein the catalyst contains from 0.025 to 0.5% by weight potassium oxide.

5. The process of claim 4 wherein regeneration is effected by maintaining the catalyst at temperatures of from about 1100 to 1300° F. for a period of from about 15 to 30 hours.

References Cited by the Examiner

UNITED STATES PATENTS

| | | | |
|---|---|---|---|
| 2,401,802 | 6/46 | Taylor et al. | 260—680 |
| 2,426,118 | 8/47 | Parker et al. | 260—680 |
| 2,474,014 | 6/49 | Seebold | 260—683.3 |
| 2,585,033 | 2/52 | Pitzer | 260—683.3 |
| 2,762,752 | 9/56 | Hemminger | 252—416 |
| 2,824,843 | 2/58 | Dietzler et al. | 260—680 |
| 2,849,478 | 8/58 | Zubay et al. | 252—465 |

ALPHONSO D. SULLIVAN, *Primary Examiner.*

ALLAN M. BOETTCHER, ABRAHAM RIMENS, MILTON STERMAN, *Examiners.*

UNITED STATES PATENT OFFICE
CERTIFICATE OF CORRECTION

Patent No. 3,180,903                                                    April 27, 1965

Robert H. Lindquist et al.

It is hereby certified that error appears in the above numbered patent requiring correction and that the said Letters Patent should read as corrected below.

Column 1, line 64, for "the" read -- are --; column 2, line 28, for "temperatures" read -- temperature --; column 5, line 58, for "of", second occurrence, read -- to --; line 74, for "use" read -- used --.

Signed and sealed this 28th day of September 1965.

(SEAL)
Attest:

ERNEST W. SWIDER                                            EDWARD J. BRENNER
Attesting Officer                                                 Commissioner of Patents